United States Patent [19]  [11] Patent Number: 4,511,835
Studtmann  [45] Date of Patent: Apr. 16, 1985

[54] VOLTAGE-CONTROLLED, INVERTER-MOTOR SYSTEM

[75] Inventor: George H. Studtmann, Mt. Prospect, Ill.

[73] Assignee: Borg-Warner Corporation, Chicago, Ill.

[21] Appl. No.: 452,560

[22] Filed: Dec. 23, 1982

[51] Int. Cl.³ .............................................. H02P 7/42
[52] U.S. Cl. ................................... 318/700; 318/722; 318/723
[58] Field of Search .............. 318/700, 705, 714, 715, 318/717, 720–723, 798–811; 363/79

[56] References Cited

U.S. PATENT DOCUMENTS

| | | | |
|---|---|---|---|
| 3,321,697 | 5/1967 | Etter | 321/45 |
| 3,340,453 | 9/1967 | Bradley et al. | 321/5 |
| 3,423,662 | 1/1969 | Schlabach et al. | 321/5 |
| 3,600,658 | 8/1971 | Kuniyoshi | 318/254 |
| 3,731,172 | 5/1973 | Kaufman | 318/439 |
| 3,872,364 | 3/1975 | Hubner | 318/227 |
| 3,906,314 | 9/1975 | Wiart | 318/138 |
| 4,276,505 | 6/1981 | Bose | 318/723 |
| 4,321,518 | 3/1982 | Akamatsu | 318/696 |
| 4,327,315 | 4/1982 | Kawada et al. | 318/803 |
| 4,328,454 | 5/1982 | Okuyama et al. | 363/79 |
| 4,375,612 | 3/1983 | Wirth | 318/803 |
| 4,394,610 | 7/1983 | Dolland | 318/803 |
| 4,437,050 | 3/1984 | Overzet | 318/803 |

Primary Examiner—E. A. Goldberg
Assistant Examiner—A. Evans
Attorney, Agent, or Firm—James E. Tracy

[57] ABSTRACT

A relatively simple inverter-motor system, comprising a minimum number of circuit components, is provided by employing a voltage-controlled thyristor inverter which in turn drives a synchronous motor having a leading power factor. With the motor current leading the motor voltage, the thyristor switching devices will be motor-commutated, thereby precluding the need for any auxiliary commutating elements or circuits to effect forced commutation. Since, with a leading power factor, the current through a conducting thyristor falls to zero before the thyristor has to be switched off, ample turn-off time is provided. Furthermore, as compared to a conventional forced commutated voltage source inverter, the customary reactive diodes, usually shunting the switching devices in an inverter to permit the flow of reactive motor current, are not necessary. Moreover, by powering the inverter with a voltage source, rather than with a current source, the commutation process is greatly facilitated, the need for damper windings on the motor is eliminated, and the physical size of the d-c link inductor normally required by a current source inverter is greatly reduced.

12 Claims, 5 Drawing Figures

VOLTAGE-CONTROLLED, INVERTER-MOTOR SYSTEM

BACKGROUND OF THE INVENTION

This invention relates to a voltage-controlled, variable speed inverter drive for an a-c motor, the construction of the inverter-motor system being substantially simplified compared to previously developed systems.

Many variable speed a-c motor drives comprise a forced-commutated thyristor inverter feeding an a-c motor. The thyristor switching devices (which usually take the form of silicon controlled rectifiers or SCR's) in the inverter are gated or turned on in a prescribed sequence in order to convert an applied d-c voltage, received from a d-c power supply, to a-c voltage for application to the a-c motor. Capacitors, additional switching devices or other commutating elements are required to turn off or commutate the conducting thyristors. Reactive diodes usually shunt the thyristors to provide a path for the circulation of reactive motor current. Of course, the inclusion of such forced commutation circuitry and reactive diodes adds considerable cost and complexity to the inverter.

It is known that the need for forced commutation is obviated by employing an a-c synchronous motor, which is constructed to present a leading power factor to the inverter drive, the alternating current in each of the motor stator windings thereby always leading the alternating motor voltage across the winding. Design techniques for constructing a synchronous motor to have a leading power factor are well understood in the art. Basically, it involves providing a motor back emf (electromotive force) that is greater than the applied inverter voltage. The back emf is induced in the stator windings by the rotating flux produced by the magnet (either a permanent magnet or an electromagnet) in the rotor. With a leading power factor the thyristors will be motor-commutated, meaning that when a thyristor is gated on it will cause the back emf to reverse bias and to turn off a previously conducting thyristor, the motor current thereby effectively transferring to the on-coming thyristor.

The previously developed synchronous motor-commutated thyristor inverter drives were fed by constant current sources. With such an arrangement, the current flowing through a conducting thyristor is maintained essentially constant during the entire on-time and until the thyristor is commutated off. During that on-time, a substantial amount of magnetic energy builds up and becomes locked in the equivalent inductance of the motor and this energy must be removed from the stator winding before the thyristor can be turned off. The removal of the energy from the stator winding is accomplished by two means in the conventional current source inverter. Some of the energy is transferred magnetically to a damper winding which, in effect, is a series of shorted turns on the rotor. At the time of commutation, currents are generated in these turns which sustain the flux that was previously supported by currents in the stator winding. Whatever energy that is stored in the stator flux fields which do not link the damper winding is transferred conductively to the back emf generator of the oncoming phase. Reference to FIG. 1 will help clarify the latter point.

In FIG. 1, a portion of a current source inverter is shown in which a constant current I is assumed to be flowing through a large inductor 10, SCR 11, motor inductance 12, equivalent motor voltage generators 13 and 14, motor inductance 15, and SCR 16. The motor inductances 12, 15, 17 are the equivalent commutating inductances which account for the flux fields that do not link the damper windings. At time, $t_o$, shown on the accompanying graph, SCR 18 is assumed to be triggered. As is known in the art, if the motor power factor is leading, then the line-to-line motor voltage appearing across points 19 and 21 will have the polarity shown. This voltage is in the direction to cause current $i_{22}$ to decay to zero and current $i_{23}$ to build up as shown in the diagram. The large value of the d-c link inductance 10 maintains the input d-c current at the constant value of I during the commutation interval. As shown in the diagram, current $i_{22}$ goes to zero and current $i_{23}$ builds up to I. The line-to-line voltage appearing across points 19 and 21 reverse biases SCR 11 after current $i_{22}$ has gone to zero. For successful commutation, the negative bias must last long enough to provide sufficient hold-off time for SCR 11.

The preponderance of the time to effect successful commutation is composed of the time $t_o$ and $t_1$ during which time the energy and current transfer occurs from inductance 12 to inductance 17. This transfer time T will be given approximately by:

$$T = \frac{2LI}{\overline{E}_m} \quad (1)$$

where: $L$ = commutating inductance, i.e. - 12

$I$ = current in winding prior to commutation $\overline{E}_m$ = equivalent motor voltage averaged over the transfer time $T$ It is desirable to minimize the transfer time so that operation is efficient as possible and also to make possible operation at higher frequencies. Referring to equation 1, it is seen that transfer time T can be minimized by decreasing the value of the commutating inductance, decreasing the value of I or increasing the motor back emf.

In a conventional current source inverter, I is set by the load torque required and in general cannot be decreased. The commutating inductance may be decreased by increasing the size of the damper winding. The motor voltage may be increased by increasing the back emf which implies larger magnets or electromagnets in the machine. Thus, decreasing the commutation interval is done by considerably compromising the cost and size of the synchronous machine. In addition, the conventional current source inverter also requires a very large inductor in the d-c link to maintain the current constant, often times being the same physical size as the motor.

These shortcomings of the prior thyristor inverter-motor systems have now been overcome by the present invention. A uniquely, and yet simply, constructed thyristor inverter-motor system is provided which is capable of driving high horsepower loads. A minimum number of circuit components are needed and no commutating elements, reactive diodes, large series inductor and damper winding are necessary. In short, the present invention provides a very efficient variable-frequency, voltage-controlled, inverter-motor system which is significantly simpler and less expensive in construction than any previous inverter-motor system.

SUMMARY OF THE INVENTION

Considerable insight into the workings of the present invention may be gained by considering the operation of a synchronous motor with a symmetrically wound field winding operating from a sine wave voltage source. In FIG. 2, a sine wave source 30 supplies a synchronous motor 31 which is represented by its synchronous reactance 32 in series with its back emf generator 33. The voltage $V_L$ is applied across terminals 34 and 35, causing a current $i_L$ to flow through inductor 32 into the back emf generator 33 which generates a voltage $V_M$ across terminals 36 and 35. A phasor diagram is shown in the figure in which the back emf $V_M$ (37), being greater than the applied line voltage $V_L$ (38), results in a difference voltage $\Delta V$ (39) being applied across inductance 32 and a current $i_L$ (41) flows which lags $\Delta V$ by 90°. This current, shown translated to the origin of the diagram, leads the line voltage $V_L$ (38) by an angle $\theta$ which is referred to as the power factor angle. The angle $\delta$, 42, between the voltages 38 and 37 is usually referred to as the torque angle. In this phasor diagram, rotation is counter-clockwise and at the instant shown the applied voltage $V_L$ is zero, whereas the line current has passed through zero and has assumed some finite value.

There are four significant points to be gained by examination of FIG. 2. First, because of the leading power factor, the line current has gone to zero before the voltage is required to change polarity. The point at which the voltage changes polarity corresponds to the time of switching the complementary pair of SCR's in a classical quasi-square wave voltage source inverter. That is, the on SCR is turned off and the on-coming SCR is turned on. The fact that the current has already gone to zero means that the SCR need not be forced off but, in fact, is naturally commutated.

The second major point is that the phase relationships for the voltages and currents are determined by the relative magnitudes of the line voltage, back emf, applied torque and the synchronous reactance of the motor. These relationships are not at all determined by the commutating reactance, hence the need for a damper is eliminated. In fact, as is well-known, the damper winding on a motor operated from a voltage source inverter provides a low impedance path for harmonic currents and, hence, gives rise to increased losses, parasitic torques, etc. Thus a considerable source of cost and inefficiency may be eliminated by this approach.

The third major point is that there is no need to hold the current constant as in a current source inverter so the need for the large d-c link or bus inductor is eliminated. The invention may be practiced by exciting the d-c terminals of the inverter by any means which allows the instantaneous motor current to be determined by the back emf of the motor and the synchronous reactance just as in the sine wave analogy of FIG. 2. Thus, the d-c bus may be supplied by various voltage sources or, as will be seen later, even by an inductively filtered supply where the d-c link inductance is not large enough to hold the current constant with regard to instantaneous variations. Thus the link inductance is relatively small compared to that required for the current source inverter.

The fourth major point is that since the current naturally falls to zero, shaped by the motor voltage throughout the cycle, the current transfer time alluded to in the current source inverter is not needed and, hence, less back emf is required, which implies less permanent magnet or electromagnet on the motor rotor. This improvement shows up in a lessening of the requirement for leading power factor which has found to change from 0.85 leading for a current source inverter to 0.95 for the voltage source inverter.

Therefore, by allowing the current to be shaped by the back emf of the motor rather than holding it fixed using a current source inverter, the following benefits accrue:

1. The motor is smaller and less expensive because the damper is eliminated, and less magnet or electromagnet is needed because less leading power factor is required.
2. The efficiency of the motor is increased because the flow of harmonic currents associated with a damper winding is eliminated.
3. The large inductor used for current source inverters is not needed.
4. A variety of d-c sources may be used to supply the inverter.

It should be noted that the explanation used for FIG. 2 assuming a symmetrically wound rotor also holds for a salient pole rotor. Although the vector diagram becomes more complicated, the same phenomenon occurs.

It should also be noted that a key element of the invention is that the motor current waveshape be allowed to be shaped by the motor back emf. That is, the current must be permitted to vary so as to follow an essentially sinusoidal envelope. On the other hand, the average current, as will be seen in an embodiment to be described later, may be maintained constant. Therefore, although operation from a voltage source may be the most common way to provide the required degree of freedom, it is not in fact the only method that will work.

With the foregoing in mind, the structure of the invention may be summarized as follows. The voltage-controlled, inverter-motor system of the invention comprises a controlled d-c voltage source for developing an adjustable d-c bus voltage. A thyristor inverter, having a series of thyristor switching devices and being coupled to the controlled d-c voltage source over a d-c bus to receive the d-c bus voltage, is provided for producing an output a-c voltage whose amplitude is determined by the magnitude of the d-c bus voltage, while the frequency of the inverter output a-c voltage is determined by the frequency of gating pulses applied to the thyristor switching devices. A synchronous motor, having a plurality of stator windings, is driven by the inverter output a-c voltage and is constructed to present a leading power factor to the inverter at all times, the alternating motor current flowing through each stator winding thereby always leading the alternating motor voltage across that winding. There are means for controlling the d-c voltage source to adjust the d-c bus voltage to the average magnitude required to establish the inverter output a-c voltage at a desired steady state amplitude. Means are provided for supplying gating pulses to the thyristor switching devices to turn the devices on in a prescribed sequence and at a predetermined frequency to establish the inverter output a-c voltage at a desired steady state frequency, thereby setting the motor speed at a desired level. With this unique arrangement, the thyristor switching devices are motor-commutated with the current, flowing through a conducting switching device and into an associated stator winding, falling to zero before the alternating voltage across that winding completes a positive half cycle and drops to zero.

DESCRIPTION OF THE DRAWINGS ILLUSTRATING THE INVENTION

The features of the invention which are believed to be novel are set forth with particularity in the appended claims. The invention may best be understood, however, by reference to the following description in conjunction with the accompanying drawings in which:

FIG. 1 schematically illustrates a portion of a current source inverter with associated current and voltage wave forms during the commutation interval;

FIG. 2 illustrates a synchronous motor operating form a sinwave voltage source, with an associated phasor diagram;

FIG. 3 schematically illustrates a voltage-controlled, inverter-motor system constructed in accordance with one embodiment of the present invention;

DESCRIPTION OF THE ILLUSTRATED EMBODIMENTS

Figure 2:
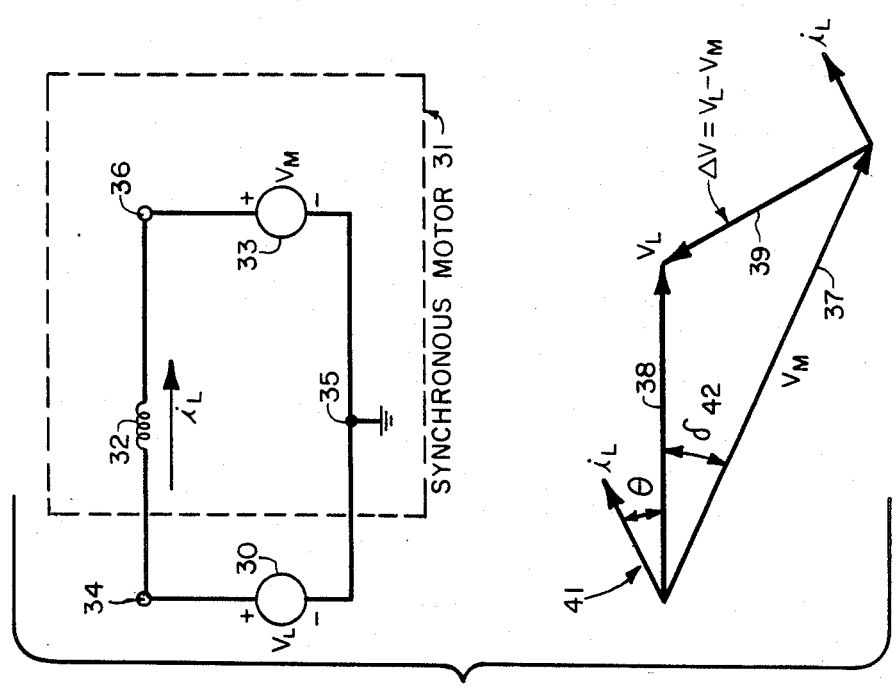
Figure 1:
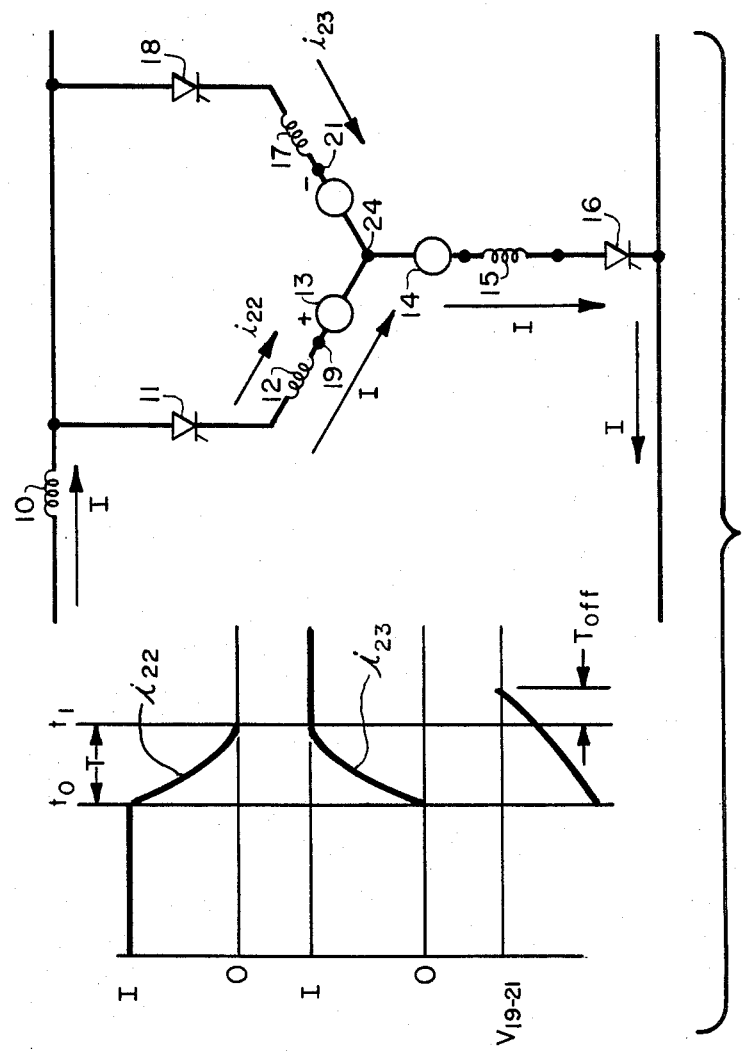
Figure 3:
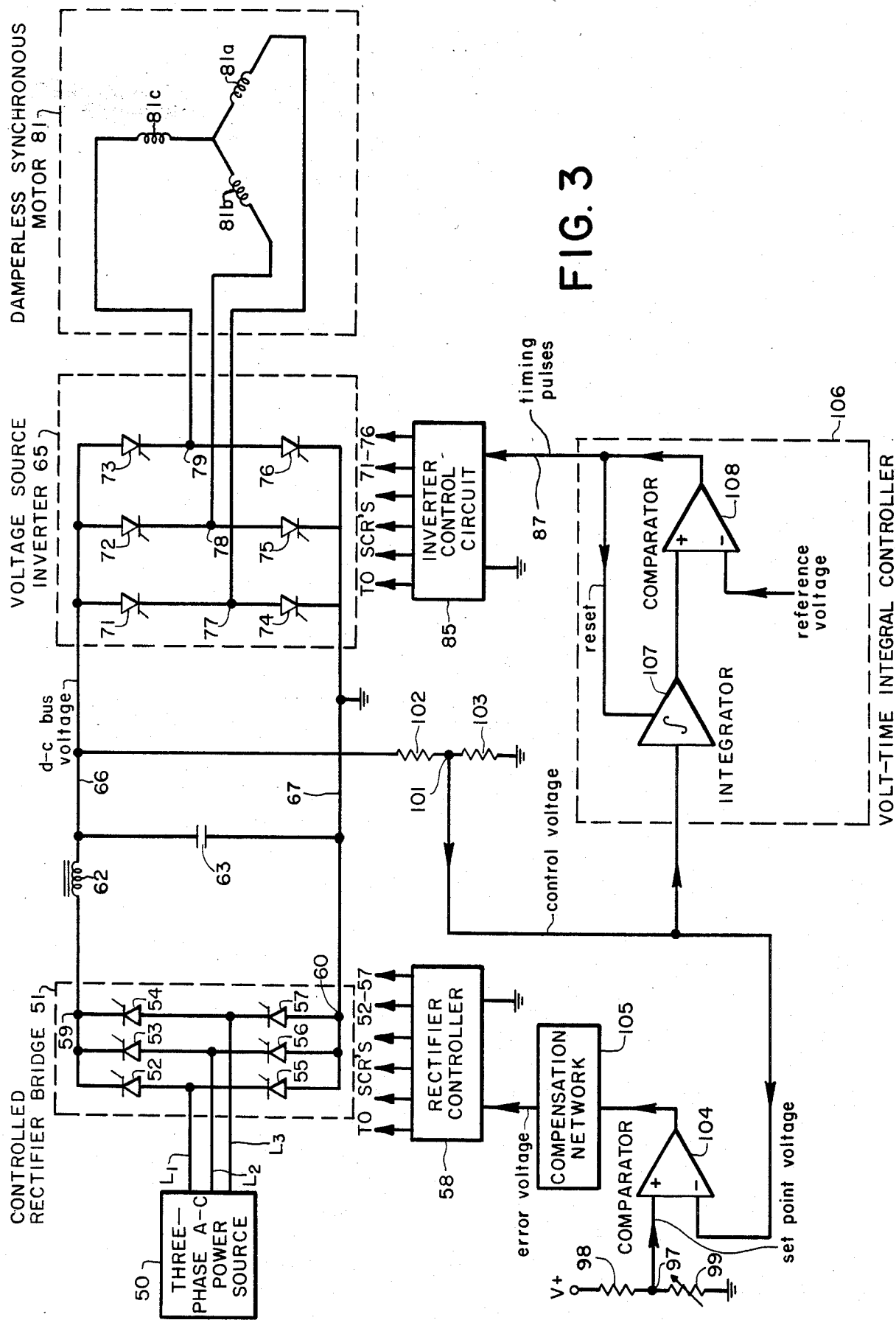

Referring now to FIG. 3, line conductors $L_1$, $L_2$ and $L_3$ connect to a conventional three-phase A-C power source 50 which may be the usual A-C power mains, and thus provide three-phase A-C voltage, namely three alternating voltages varying in sinusoidal fashion and having the same amplitude and frequency but being phase-displaced with respect to each other by 120°. The frequency of the a-c line voltages will usually be either 50 or 60 cycles per second or hertz, and the magnitude of those voltages may take any appropriate value depending on the characteristics of the load to be energized or driven. Since there is no neutral line conductor from the A-C power supply, each of the three phase or line voltages is actually a line-to-line voltage and appears on one of the line conductors $L_1$, $L_2$ and $L_3$ relative to another one of the line conductors. The a-c energy received over the line conductors is rectified and convertered to d-c power by a phase-controlled full wave rectifier bridge 51 which is of well-known construction. Specifically, rectifier bridge 51 has a family of six thyristors, in the form of SCR's 52-57, arranged in three pairs, to each of which pairs is applied a respective one of the three alternating phase or line voltages provided by three-phase A-C power source 50. The firing angles of the six SCR's are controlled, by gating signals from rectifier controller 58, in order to establish at the bridge's positive and negative output terminals (designated 59 and 60, respectively) a rectified voltage of a desired magnitude and in order to control the power supplied from source 50 and through bridge 51 to the inverter-motor arrangement.

More specifically, the d-c voltage level at the bridge's output 59, 60 and the power flow through the bridge are adjusted by regulating the firing angles of the SCR's 52-57 during each half cycle of the applied a-c voltage. Each SCR in bridge 51 can conduct, during each half cycle of the voltage applied thereto from three-phase A-C power source 50, when the SCR's anode is positive relative to its cathode. However, conduction will not occur during a half cycle until gate current is supplied to the SCR's gate from rectifier controller 58. At that instant, the SCR fires into conduction, or turns on, and permits load current to flow therethrough for 120° at which time the firing of the oncoming SCR causes the conducting SCR to be reversed biased, turning it off. The greater the angle or time delay between the start of a half cycle and the firing of the SCR into conduction, the less will be the average rectified voltage across terminals 59 and 60 which, of course, will be of positive polarity at terminal 59 with respect to terminal 60.

Series-connected inductor 62 and shunt-connected capacitor 63 filter the rectified voltage from the bridge to develop a filtered d-c voltage for application to voltage source thyristor inverter 65 over the d-c bus provided by lines 66 and 67. A positive-polarity d-c bus voltage will therefore appear on line 66 with respect to line 67 which is connected to a ground plane of reference potential or circuit common, zero volts in the illustrated embodiment. The inductance of inductor 62 need not be very large. As will be made apparent, relatively little filtering or smoothing is required and it is particularly important that the d-c bus current not be constrained and held constant as the thyristors in inverter 65 are switched on and off. The bus current waveshape must be allowed to vary during the inverter cycle. As has been explained the mechanism that determines the current waveshape is the back emf, developed in the motor, compared to the voltage applied to the motor. It is the difference between those voltages which causes the current to vary as the inverter thyristors are cycled on and off. Actually, the minimum inductance of inductor 62 is set by two considerations. The first is the amount of current limiting desired in case of misfiring of the inverter thyristors resulting in an unwanted short circuit across the d-c bus 66, 67. The second consideration is the amount of allowable ripple current flowing from the input bridge 51. In any event, the electrical size of inductor 62 is very small compared to that that would be required if the inverter had to be fed by a current source, rather than a voltage source as in the present invention. While filter capacitor 63 is illustrated in the drawing, it should be understood that in another embodiment the invention may be practiced with no filter capacitance whatsoever, in a manner to be elaborated on later.

By controlling the firing angles of SCR's 52-57 the d-c bus voltage applied to inverter 65, via bus 66, 67, is controlled. It will be recognized that the controlled d-c voltage source (namely rectifier bridge 51 and filter 62, 63) may operate in response to single-phase rather than three-phase a-c energy. In the single-phase environment, line conductor $L_3$ and SCR's 54 and 57 would be omitted. Of course, a d-c bus voltage of positive polarity will still be produced on line 66 with respect to line 67. It should also be appreciated that the construction of the controlled d-c voltage source may take a variety of different forms. For example, it could be provided by a d-c to d-c converter, or chopper, supplied by a d-c bus.

Thyristor inverter 65 is of the three-phase bridge type. It includes six thyristor switching devices, in the form of SCR's 71-76, arranged in three phases or legs, each leg having a pair of SCR's series-connected across the d-c bus 66, 67. The circuit junctions 77, 78 and 79 of the three legs connect to respective ones of the three wye-connected stator windings 81a, 81b and 81c of three-phase damperless synchronous motor 81, whose output shaft (not shown) drives some mechanical load. Synchronous motor 81 may be of the wound rotor type, of the brushless type, or the permanent magnet rotor type, or any other type that can exhibit a leading power factor, and its stator windings may be connected in a delta rather than a wye configuration. It is significant that the motor does not need a damper winding to remove magnetic energy from the stator windings. It should be noted that while the optimum configuration does not require the use of damper windings on the motor; the system will work, however, if damper windings are used for some other reason. Higher harmonic currents will flow with an attendant decrease in efficiency but the system will still function.

It should also be noted that alternative inverter configurations are possible as will be obvious to one skilled in the art. Among others, these include inverters using center-tapped transformers or center-tapped motor windings with SCR's connected to the outermost ends of the windings. Also, inverters and motors of other than three phase are usable such as single, two or six phase, etc.

Figure 4:
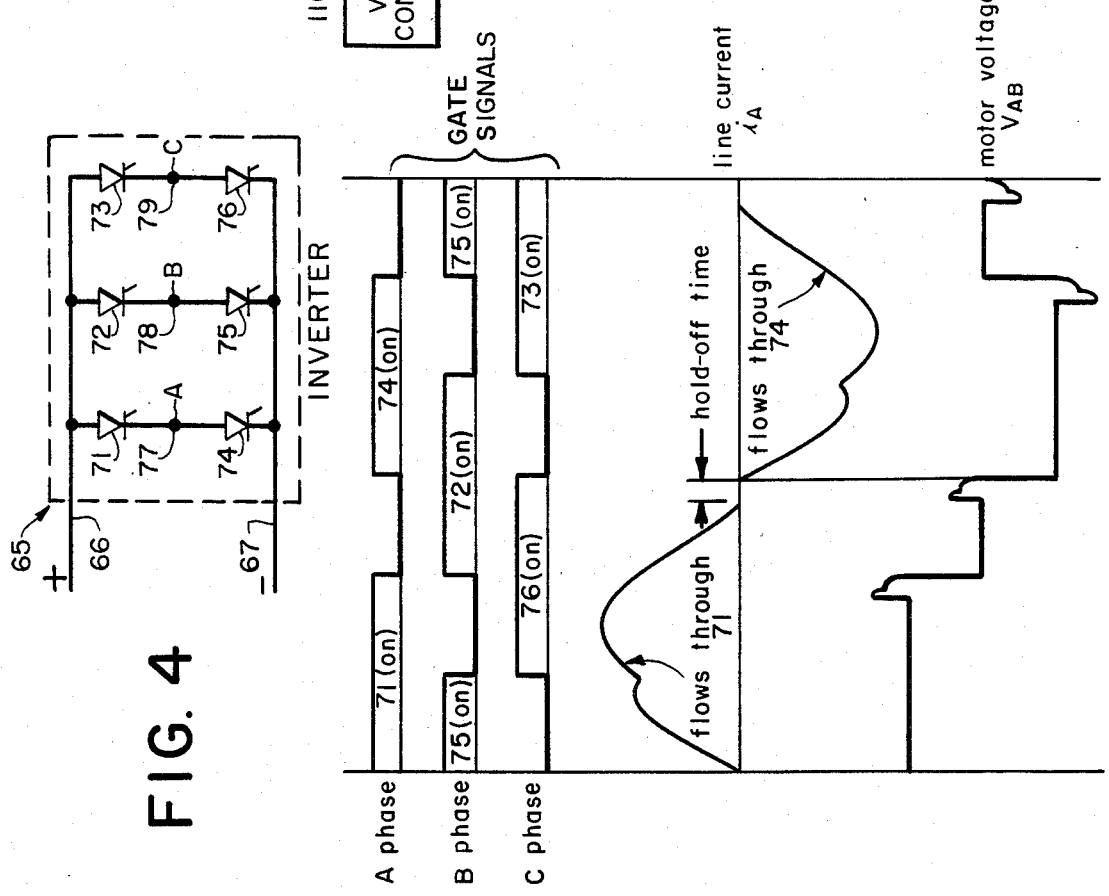
FIG. 4 shows various waveforms helpful in understanding the invention.

Reference to FIG. 4 will help clarify the manner in which the inverter is gated and the resulting waveshapes. Inverter 65, consisting of the six SCR's 71-76, is supplied d-c voltage from lines 66 and 67 and delivers three phase a-c voltage to output terminals 77, 78 and 79 corresponding to phases A, B and C, respectively. Gate signals are supplied as shown to the six SCR gates. In the embodiment shown, the gate signal is assumed to be present for 120°. As is evident from the diagram, the gate signals for B phase are delayed 120° from those of A phase and the gate signals of C phase are delayed 120° from those of B phase. The 120° relative spacing between the gate signals of the phases is required to assure balanced operation. The 120° width of the gate signal is not absolutely required. The main requirement on the gate signal is that it must last sufficiently long to permit the SCR to turn fully on and conduct the motor line current.

The current flowing from terminal 77 ($i_A$) is shown in FIG. 4 as is the output voltage applied to the motor developed across terminals 77 and 78 ($V_{AB}$). Line currents $i_B$ and $i_C$ and line-to-line voltages $V_{BC}$, $V_{CA}$ would be identical in waveshape but shifted by 120° and 240° respectively. Line current $i_A$ flows through SCR 71 on the positive alternation and through SCR 74 on the negative alternation. The current at full load flows for almost 180° and falls to zero sufficiently before the turning on of the complementary SCR to allow the motor voltage to reverse bias the off-going SCR and provide hold-off time for the device as indicated on the diagram. This process of natural commutation is assured providing the motor exhibits a sufficiently leading power factor under all conditions as previously explained.

The motor terminal voltage $V_{AB}$ resembles a quasi square wave voltage waveshape near full load with the addition of the back emf of the motor during the hold-off time of the SCR. As the load is lightened, the amplitude of the current decreases as does the length of time that the current flows. This results in an increase in hold-off time and a corresponding increase in the length of time that the motor voltage appears across the output terminals. The output waveshape then departs more and moves from a quasi square wave waveshape as progressively more motor back emf appears across the output terminals and appears more like that of a current source inverter.

The shape of the current depends upon the particular motor used. With a damperless permanent magnet motor where the flow of harmonic currents may be small, the current becomes quite sinusoidal at full load if operated from a true voltage source. The current in a damperless wound rotor synchronous motor contains more harmonic currents due to the interaction of the field winding which, in effect, acts somewhat like a damper for harmonic currents. The scallops become more pronounced and the decay of the current near the end of the cycle becomes sharper.

As will be obvious to one skilled in the art, the inverter operation is quite different from either a conventional quasi square wave inverter or a current source inverter and represents a new class of inverter which has signficiant advantages over prior art systems.

Returning now to FIG. 3, control circuitry for supplying gating or triggering pulses to switch the SCR's 71-76 on and off in the correct sequence and at the correct times so as to provide the required three-phase a-c energy for rotating motor 81 in the desired manner is well-known to those skilled in the art. In the illustrated embodiment the block 85 labeled "inverter control circuit" includes logic circuitry which, in response to periodically recurring timing pulses received over line 87, steers the gating or firing pulses to the correct SCR's in the inverter to turn them on in the required sequence. To develop the three phase-displaced, six-step voltages for application to respective ones of the three stator windings, the switching or firing pattern of SCR's 71-76 must change every 60° of an operating cycle. The switching times are determined by the timing pulses received over line 87. Each time a timing pulse is applied to the inverter control circuit 85, a different set of SCR's will become conductive in accordance with the previously described firing sequence, six consecutive timing pulses being required to complete each six-step operating cycle for each of the three phase-displaced alternating voltages produced by inverter 65. The inverter frequency is therefore determined by the pulse repetition frequency of the timing pulses. As will be made apparent, the timing pulses are generated in such a way that the desired inverter frequency is effectively established every 60° of each operating cycle in the inverter. In this way, if it is determined that a frequency change should be made in the inverter, such a change may be made within 60° of an operating cycle. This rapid frequency control over the inverter stabilizes the operation of the motor.

It is to be particularly noted that the reactive diodes, usually shunting the inverter SCR's so that motor reactive current can flow back to the d-c power source, are not needed due to the leading power factor presented by the motor. Since the current in an off-going SCR has already dropped to zero before the SCR has to be switched off, ample turn-off and recovery time is provided so there is never any energy that has to be transferred back to the d-c voltage source. In effect, when one phase of the inverter is turned off, energy is transferred to the next phase.

Although the reactive diodes normally associated with a voltage source inverter are not necessary for operation of this circuit, they may, however, be used if desired. In this case, a reactive current flow will occur back through the diode of a particular phase when the motor back emf attempts to reverse bias the off-going SCR. The diode then conducts and reverse biases the SCR by an amount equal to the forward drop of the diode. This type of circuit may be advantageous when using SCR's with little reverse voltage blocking ability such as ASCR's (Assymetrical SCR's) which require little hold-off time, hence making high frequency drives easier to design.

There are many means to control the operation of the rectifier bridge 51 as will be obvious to one skilled in the art. One method of control is shown in FIG. 3 and will now be described in detail. To control the operation of rectifier controller 58 to adjust the amplitude of the inverter output a-c voltage and to control the operation of control circuit 85 to regulate the frequency of the inverter voltage, an adjustable set point d-c voltage is provided at the circuit junction 97 of fixed resistor 98 and adjustable resistor 99. As will be made apparent, the set point voltage from voltage divider 98, 99 determines the steady state operating conditions and represents a desired amplitude and a desired frequency for the a-c voltage produced by inverter 65 for application to motor 81. Preferably, the set point will be selected to satisfy the speed demanded by the mechanical load driven by the motor.

A control voltage, which is a function of the d-c bus voltage, is produced at the circuit junction 101 of the voltage divider formed by resistors 102 and 103 which are series-connected across the d-c bus 66, 67. More specifically, the control voltage is a scaled-down or reduced-amplitude version of the d-c bus voltage, and thus is directly proportional to the bus voltage. The control voltage is applied to the inverting or (−) input of comparator 104, the non-inverting or (+) input of the comparator being connected to junction 97 to receive the set point voltage. Comparator 104 therefore compares the set point voltage with the control voltage to provide an error voltage which is a function of the difference between the compared voltages. Rectifier controller 58, which is of well-known construction, responds to the error voltage, received from comparator 104 through a compensation network 105, to produce properly timed gating pulses for application to the gates of SCR's 52–57 to control the firing angles of the SCR's as required to establish the d-c bus voltage across lines 66 and 67 at the average magnitude necessary to establish and to maintain the inverter output voltage at the desired steady amplitude level. If the d-c bus voltage tends to vary from the requisite steady state level, the error voltage changes and causes rectifier controller 58 to automatically vary the firing angles as necessary to adjust the d-c bus voltage until the correct steady state amplitude level is reestablished.

More particularly, during steady state conditions the error voltage will be essentially zero. If the bus voltage now tends to drop, for example, the control voltage decreases and this causes the error voltage to increase in a positive direction, thereby decreasing the firing angles of SCR's 52–57 to bring the bus voltage back up to the required steady state level, whereupon the error voltage returns to zero volts. On the other hand, an increase of the bus voltage from its required average or steady state level initiates automatic correction in the opposite sense, namely the error voltage increases from zero in a negative direction to cause the firing angles of the SCR's to increase until the bus voltage returns to its desired steady state level, at which time the error voltage will return to its zero amplitude level.

In the meantime, the control voltage is applied to volt-time integral controller 106 to produce on line 87 timing pulses that are periodically recurring at a pulse repetition frequency six times the desired steady state frequency for the inverter output voltage, thereby establishing the inverter frequency at the desired level. In effect, controller 106 determines the time separation between successive timing pulses in response to the instantaneous amplitude of the control voltage. Note that both the amplitude and frequency of the inverter output voltage at steady state are determined by the same set point voltage. In a manner to be explained, the ratio of those two characteristics of the inverter voltage will be held fixed at all times, namely during transient conditions as well as during static or steady state conditions. During steady state operation a constant ratio of the inverter output voltage relative to the inverter frequency is desirable to avoid overheating of motor 81 and to provide the motor with a constant torque output capability regardless of motor speed. By maintaining a constant ratio during dynamically changing or transient conditions the operation of the motor will be stabilized.

Although the volt-time integral controller to be described in detail below is an effective means of stabilizing the system, it is not a necessary part of the present invention. Other means of stabilizing and controlling the system, such as the use of position sensors, will be obvious to one skilled in the art.

To explain the operation of volt-time integral controller 106, the control voltage is integrated in integrator 107 and the integrated voltage (which will be a positive-going ramp starting at zero volts) is applied to the non-inverting or (+) input of comparator 108, the inverting or (−) input of which receives a reference d-c voltage. When the output voltage of integrator 107 integrates up to the reference voltage, comparator 108 produces a timing pulse for application to line 87, the pulse also being fed back to effect reset of integrator 107 to zero in order to start a new integration cycle. In other words, when comparator 108 determines that the ramp-shaped integrator output voltage has reached the reference level, a timing pulse is developed to fire a new set of inverter SCR's into conduction, while at the same time the timing pulse resets the integrator 107 back to zero to commence another integration cycle. A constant volt-time integral (namely, a constant ratio of inverter output voltage relative to inverter frequency or volts/hertz) is thus obtained between successive timing pulses, and consequently between successive inverter firings, the value of this volt-time integral, or volts/hertz ratio, being set by the level of the reference voltage applied to comparator 108, the reference level being selected for optimum performance. In effect, the frequency of the inverter is adjustsed six times, or every 60°, during each inverter cycle. Every 60° of the inverter cycle a determination is made as to what the inverter frequency should be in order to obtain a constant volts/hertz ratio. Since the integral of the d-c bus voltage equals the stator flux in the motor, by maintaining a constant volt-time integral at all times the peak magnitude of the stator flux will be kept approximately constant. Hence, the peak flux will be approximately the same for each 60° interval of the inverter cycle.

It will thus be appreciated that the frequency of the inverter is directly proportional to the magnitude of the d-c bus voltage. When the bus voltage is relatively low, it takes a relatively long time for the integrator output voltage to reach the reference voltage, causing the timing pulses to have a relatively long time separation and the inverter to have a relatively low frequency. If the bus voltage is then increased, the time required for the integrator output voltage to reach the level of the reference voltage will be reduced, as a result of which the inverter frequency will be increased.

As a consequence of the action of the volt-time integral controller, stability of the motor is maintained despite transient changes. For example, if the load increases, the motor tends to slow down which tends to increase the torque angle. If this angle increases too much, the motor may pull out of synchronism or become unstable. However, with the described embodiment, the increase of load current will cause the d-c bus voltage to decrease causing the integrator to require a longer time to reach its preset limit, thereby reducing the inverter frequency. The reduction of stator frequency tends to reduce the torque angle and to maintain stability of the motor. Similar remarks hold for a decrease in load torque.

When there is a normal variation in the load demand, thereby dictating a different steady state motor speed, resistor 99 may be adjusted to vary the set point voltage to the extent necessary to change the d-c bus voltage and the control voltage as required to establish the frequency of the inverter voltage at the level necessary to drive motor 81 at the new desired speed. The new inverter output voltage, as established by the new bus voltage, and the new inverter frequency will have the same fixed ratio which is determined by the reference voltage applied to comparator 108.

More particularly, assume, for example, that a higher motor speed is desired. Resistor 99 will therefore be adjusted to increase the set point voltage, the error voltage thereby increasing from zero in a positive direction in order to decrease the firing angles of SCR's 52–57 in rectifier bridge 51. The d-c bus voltage and the control voltage therefore increase, causing the inverter frequency, and consequently the motor speed, to increase. When the new desired steady state motor speed is established and the system is in equilibrium with new steady state operating characteristics, the error voltage returns to zero volts. The firing angles of the SCR's 52–57 will, however, remain at their smaller angles to maintain the bus voltage at the new required higher level. As is well understood in the art, this is usually achieved by means of an integrator (not shown) within rectifier controller 58 which effectively stores the positively-increasing error voltage to hold the firing angles at their smaller values after the bus voltage reaches its new steady state level and the error voltage is reduced back to zero, where it always is under steady state conditions.

Conversely, if a lower motor speed is needed, the set point voltage is reduced, whereupon the error voltage increases from zero in a negative direction to increase the firing angles of SCR's 52–57 as necessary to lower the bus voltage, the control voltage and the inverter frequency to the extent required to obtain the new desired lower motor speed. Once again the error voltage is restored to zero when the new steady state conditions are established, but the firing angles will be held at their new larger angles stored in the integrator in rectifier controller 58.

Of course, while the motor speed may be changed by manually adjusting resistor 99, the set point voltage may be derived by sensing some parameter or characteristic of the system, in which the voltage-controlled inverter-motor system is incorporated, in order to automatically control the motor speed in response to that sensed information.

Figure 5:
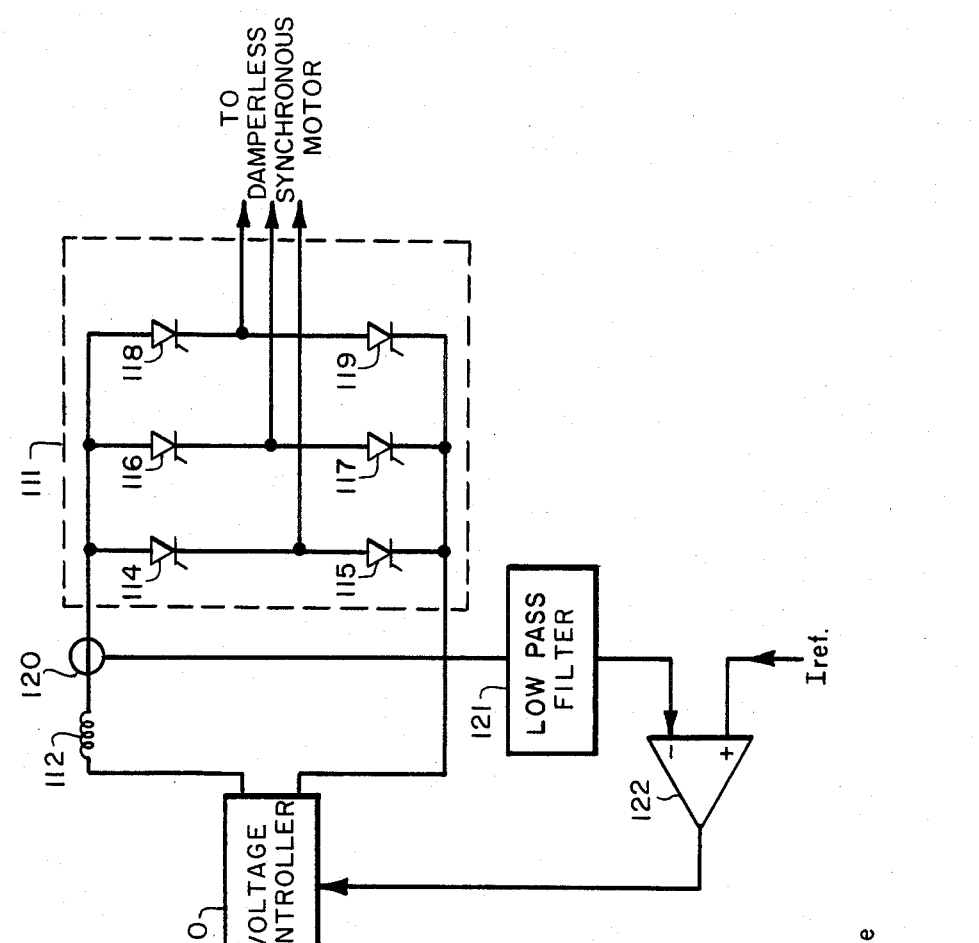
FIG. 5 illustrates another embodiment of the invention.

Another embodiment of the invention is shown in FIG. 5. In this figure, a generalized voltage controller 110, which may be a phase-controlled rectifier operating from an AC source, a DC-DC converter such as a chopper, or any other suitable means, provides a source of energy to the inverter 111 via an inductor 112. The inverter consists of six SCR's 114–119 which are gated as previously described and supplies energy to a damperless synchronous motor. Although the inverter topology is similar to that of a current source inverter, there are important differences. One difference is that the d-c link inductor 112 is not required to maintain the current constant and, hence, is of the order of one-fourth to one-fifth of the size of the inductor for a corresponding current source inverter. The inductor needs to be sized only large enough to limit the fault current in the event of a lock-on of two or more of the inverter SCR's. The motor may of course also be damperless which is not possible with a current source inverter.

Various control schemes are possible to provide the necessary non-constraining of the d-c current. One method, previously described, senses the average d-c bus voltage and controls the input voltage controller accordingly. The method shown in FIG. 5 uses a current sensor 120 to sense the d-c link current. This sensed signal is applied to a low pass filter 121 and is then compared to a desired reference signal in comparator 122. The error is then used to command the voltage controller 110 to reduce this error to any desired minimum. In this manner, the voltage controller will not correct for the high frequency ripple currents generated by the motor back emf acting through the inverter and, hence, the required degree of freedom needed to allow the currents to be determined by the motor back emf is provided, and the motor currents will fall to zero toward the end of the half cycle as previously described. It is also apparent that the circuit of FIG. 5 will permit the controller 110 to respond to the average value of the bus current and any low frequencies up to the cut-off point of the filter. In this manner, the average value of the current, hence average torque to the motor, is controlled and the effect of the generation of any beat frequencies between the source and the motor my be reduced.

Other control schemes, which will permit the current to have the required degree of freedom for successful operation, will be obvious to one skilled in the art and fall within the scope of this invention. Alternatively, for example, the d-c bus voltage may be sensed in the circuit of FIG. 5, averaged and compared to a reference to provide an appropriate error signal. From the foregoing explanation, it will be understood that the terms "voltage source inverter" and "voltage-controlled inverter", as used herein and in the appended claims, embraces any inverter whose control system does not constrain the current to a fixed value as in a conventional current source inverter, but rather lets the current follow the essentially sinusoidal waveshape dictated by the back emf of the motor so that the current falls naturally to zero before the end of the half cycle.

To summarize the invention again, a uniquely constructed voltage-controlled motor commutated inverter system, requiring a minimum number of components, is provided wherein a synchronous motor, having a leading power factor, commutates the thyristors (SCR's) and in which the following advantages accrue over prior art systems:

1. The motor is smaller and less expensive because it does not require damper windings, and the power factor may be substantially less leading than the prior art systems.

2. The efficiency of the motor is increased because the flow of harmonic currents associated with a damper winding is eliminated.

3. The large inductor used for current source inverters is drastically reduced.

4. A variety of DC voltage sources and control schemes may be used permitting design flexibility.

While particular embodiments of the invention have been shown and described, modifications may be made, and it is intended in the appended claims to cover all such modifications as may fall within the true spirit and scope of the invention.

I claim:

1. A voltage-controlled, inverter-motor system, comprising:
   a controlled d-c voltage source, having a relatively low internal impedance, for developing an adjustable d-c bus voltage;
   a thyristor inverter having a series of thyristor switching devices and operated in response to said d-c bus voltage to develop an output a-c voltage;
   means for establishing the amplitude and frequency of the inverter output a-c voltage at desired levels;
   and a synchronous motor, having a leading power factor, driven by the inverter output a-c voltage, said thyristor switching devices being motor-commutated.

2. A voltage-controlled, inverter-motor system, comprising:
   a controlled d-c voltage source, having a relatively low internal impedance, for developing an adjustable d-c bus voltage;
   a thyristor inverter, having a series of thyristor switching devices and being coupled to said controlled d-c voltage source over a d-c bus to receive the d-c bus voltage, for producing an output a-c voltage whose amplitude is determined by the magnitude of the d-c bus voltage, while the frequency of the inverter output a-c voltage is determined by the frequency of gating pulses applied to said thyristor switching devices;
   a synchronous motor, having a plurality of stator windings, driven by the inverter output a-c voltage and constructed to present a leading power factor to said inverter at all times, the alternating motor current flowing through each stator winding thereby always leading the alternating motor voltage across that winding;
   means for controlling said d-c voltage source to adjust the d-c bus voltage to the average magnitude required to establish the inverter output a-c voltage at a desired steady state amplitude;
   and means for supplying gating pulses to said thyristor switching devices to turn said devices on in a prescribed sequence and at a predetermined frequency to establish the inverter output a-c voltage at a desired steady state frequency, thereby setting the motor speed at a desired level,
   said thyristor switching devices being motor-commutated with the current, flowing through a conducting switching device and into an associated stator winding, falling to zero before the alternating voltage across that winding completes a positive half cycle and drops to zero.

3. A voltage-controlled, inverter-motor system according to claim 2 wherein said synchronous motor is damperless.

4. A voltage-controlled, inverter-motor system according to claim 2 wherein said thyristor switching devices are SCR's.

5. A voltage-controlled, inverter-motor system according to claim 2 wherein said synchronous motor is of the permanent magnet rotor type.

6. A voltage-controlled, inverter-motor system according to claim 2 wherein said synchronous motor is a three-phase motor having three stator windings, and wherein said inverter is a three-phase inverter bridge, comprising six thyristor switching devices, which produces three phase-displaced alternating voltages and delivers three-phase alternating current to the three stator windings.

7. A voltage-controlled, inverter-motor system according to claim 2 and including means for providing a set point voltage representing the desired steady state amplitude and also the desired steady state frequency for the a-c voltage produced by the inverter, and wherein the set point voltage is utilized to establish the inverter output voltage at the desired steady state amplitude and frequency levels.

8. A voltage-controlled, inverter-motor system according to claim 2 wherein said controlled d-c voltage source includes a phase-controlled SCR rectifier bridge and a series-connected inductor for developing the d-c bus voltage from a-c energy received from an a-c power source.

9. A voltage-controlled, inverter-motor system according to claim 8 wherein the inductance of said inductor is only high enough to effect a relatively small amount of waveshaping of the bus current flowing through said d-c bus and to provide sufficient current limiting protection in the event of an unwanted short circuit across said d-c bus.

10. A voltage-controlled, inverter-motor system according to claim 8 wherein a filter capacitor is shunt-connected across the output of said controlled d-c voltage source and across said d-c bus.

11. An inverter-motor system comprising:
    a controlled d-c voltage source, having a relatively low internal impedance, for developing an adjustable d-c bus voltage;
    a thyristor inverter, having a series of thyristor switching devices and being coupled to said controlled d-c voltage source over a d-c bus to receive the d-c bus voltage, for producing an output a-c voltage whose amplitude is determined by the magnitude of the d-c bus voltage, while the frequency of the inverter output a-c voltage is determined by the frequency of gating pulses applied to said thyristor switching devices;
    a synchronous motor, having a plurality of stator windings, driven by the inverter output a-c voltage and constructed to present a leading power factor to said inverter at all times, the alternating motor current flowing through each stator winding thereby always leading the alternating motor voltage across that winding;
    means for controlling said d-c voltage source to adjust the d-c bus voltage to the average magnitude required to establish the inverter output a-c voltage at a desired steady state amplitude;
    and means for supplying gating pulses to said thyristor switching devices to turn said devices on in a prescribed sequence and at a predetermined frequency to establish the inverter output a-c voltage at a desired steady state frequency, thereby setting the motor speed at a desired level, said thyristor switching devices being motor-commutated with the current, flowing through a conducting switching device and into an associated stator winding, falling to zero before the alternating voltage across that winding completes a positive half cycle and drops to zero.

12. A voltage-controlled, inverter-motor system, comprising:

- a d-c voltage source, having a relatively low internal impedance, for developing a d-c bus voltage;
- a thyristor inverter, having a series of thyristor switching devices and being coupled to said d-c voltage source over a d-c bus to receive the d-c bus voltage, for producing an output a-c voltage whose amplitude is determined by the magnitude of the d-c bus voltage, while the frequency of the inverter output a-c voltage is determined by the frequency of gating pulses applied to said thyristor switching devices;
- a synchronous motor, having a plurality of stator windings, driven by the inverter output a-c voltage and constructed to present a leading power factor to said inverter at all times, the alternating motor current flowing through each stator winding thereby always leading the alternating motor voltage across that winding;
- and means for supplying gating pulses to said thyristor switching devices to turn said devices on in a prescribed sequence and at a predetermined frequency to establish the inverter output a-c voltage at a desired steady state frequency, thereby setting the motor speed at a desired level, said thyristor switching devices being motor-commutated with the current, flowing through a conducting switching device and into an associated stator winding, falling to zero before the alternating voltage across that winding completes a positive half cycle and drops to zero.

* * * * *